US009656754B2

(12) United States Patent
Grosse-Plankermann et al.

(10) Patent No.: US 9,656,754 B2
(45) Date of Patent: May 23, 2017

(54) VENTILATION SYSTEM AND AIRCRAFT AIR-CONDITIONING SYSTEM

(75) Inventors: Peter Grosse-Plankermann, Neu Wulmstorf (DE); Martin Paetz, Hamburg (DE); Thomas Fink, Hamburg (DE)

(73) Assignee: Airbus Operations GmbH (DE)

( * ) Notice: Subject to any disclaimer, the term of this patent is extended or adjusted under 35 U.S.C. 154(b) by 484 days.

(21) Appl. No.: 13/302,719

(22) Filed: Nov. 22, 2011

(65) Prior Publication Data
US 2012/0129438 A1    May 24, 2012

Related U.S. Application Data

(60) Provisional application No. 61/415,996, filed on Nov. 22, 2010.

(30) Foreign Application Priority Data

Nov. 22, 2010 (DE) .................... 10 2010 052 157

(51) Int. Cl.
*B64D 13/00* (2006.01)

(52) U.S. Cl.
CPC ........ *B64D 13/00* (2013.01); *B64D 2013/003* (2013.01)

(58) Field of Classification Search
CPC .................. B64D 13/00; B64D 2013/003
USPC .. 454/143, 145, 152, 62, 63, 64, 69, 71, 72, 454/73, 74, 76, 77, 78, 89, 87, 94, 108, 454/107, 83; 244/118.5
See application file for complete search history.

(56) References Cited

U.S. PATENT DOCUMENTS 5,556,332 A     9/1996  Schumacher
6,508,702 B1 *  1/2003  Fabiano ............. B60H 1/00378
                                                      454/138
(Continued)

FOREIGN PATENT DOCUMENTS

DE   10 2007 014 406 B3    3/2007
DE   10 2007 040 203 A1    2/2009
(Continued)

OTHER PUBLICATIONS

English language machine translation for DE 10 2010 008 626, Aug. 25, 2011 (from publication WO 2011/101211 A1).
(Continued)

*Primary Examiner* — Avinash Savani
*Assistant Examiner* — Vivek Shirsat
(74) *Attorney, Agent, or Firm* — Taft Stettinius & Hollister LLP

(57) ABSTRACT

A ventilation system (10) for installation in an aircraft passenger cabin comprises an air supply pipe (12), which has a plurality of air outlet openings (14) disposed in a distributed manner along its longitudinal axis (L). An air chamber housing (16) is connectable to the air supply pipe (12) at various positions along the longitudinal axis (L) of the air supply pipe, such that air-conditioning air flowing through the air supply pipe (12) is supplyable, through an air outlet opening provided in the air supply pipe (12), into the air chamber housing (16). A connection device (34) is designed to connect the air chamber housing (16) to an air supply device (36) for supplying air-conditioning air into the aircraft passenger cabin.

14 Claims, 5 Drawing Sheets

(56) References Cited

U.S. PATENT DOCUMENTS

Figure 2A:
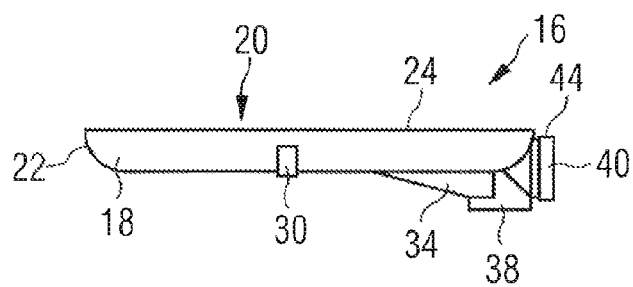

| | | | |
|---|---|---|---|
| 6,857,955 B1 * | 2/2005 | Held | 454/144 |
| 2006/0130997 A1 * | 6/2006 | Marshall | 165/41 |
| 2007/0184773 A1 * | 8/2007 | Babian | 454/143 |
| 2008/0157607 A1 * | 7/2008 | Scheich et al. | 310/12 |
| 2008/0268762 A1 * | 10/2008 | Bruggen | B64D 13/00 454/76 |
| 2009/0298408 A1 * | 12/2009 | Reisbach | B64D 13/00 454/76 |
| 2010/0087130 A1 | 4/2010 | Nitsche et al. | |
| 2011/0240796 A1 | 10/2011 | Schneider | |
| 2013/0149950 A1 * | 6/2013 | Umlauft et al. | 454/76 |

FOREIGN PATENT DOCUMENTS

| | | |
|---|---|---|
| DE | 10 2008 058 271 A1 | 5/2010 |
| DE | 10 2010 012 882 B3 | 7/2011 |
| DE | 10 2010 008 626 A1 | 8/2011 |
| DE | 10 2010 018 502 A1 | 11/2011 |
| EP | 0 607 602 A1 | 12/1993 |
| WO | WO 2008116862 A1 * | 10/2008 |

OTHER PUBLICATIONS

English language machine translation for DE 10 2007 040 203, Feb. 26, 2009.

English language machine translation for DE 10 2010 012 882, Jul. 18, 2011.

English language machine translation for DE 10 2010 018 502, Nov. 3, 2011 (from publication WO 2011/134614 A2).

\* cited by examiner

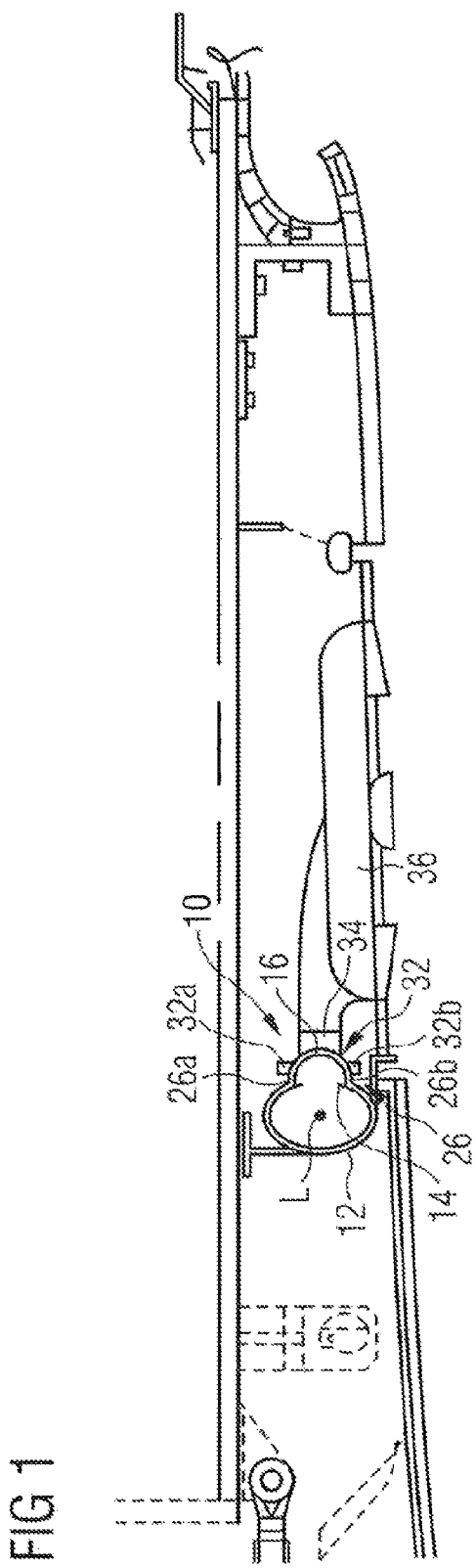

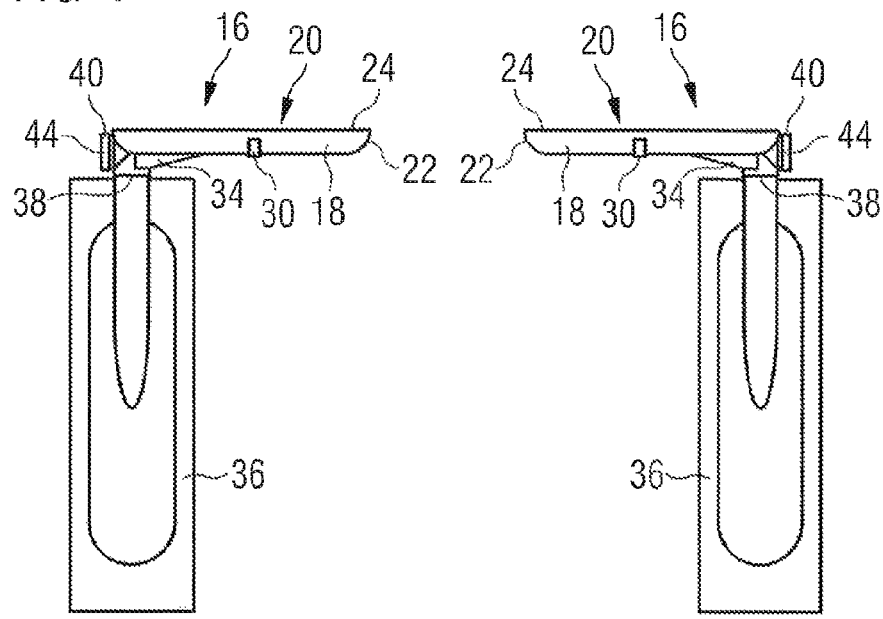
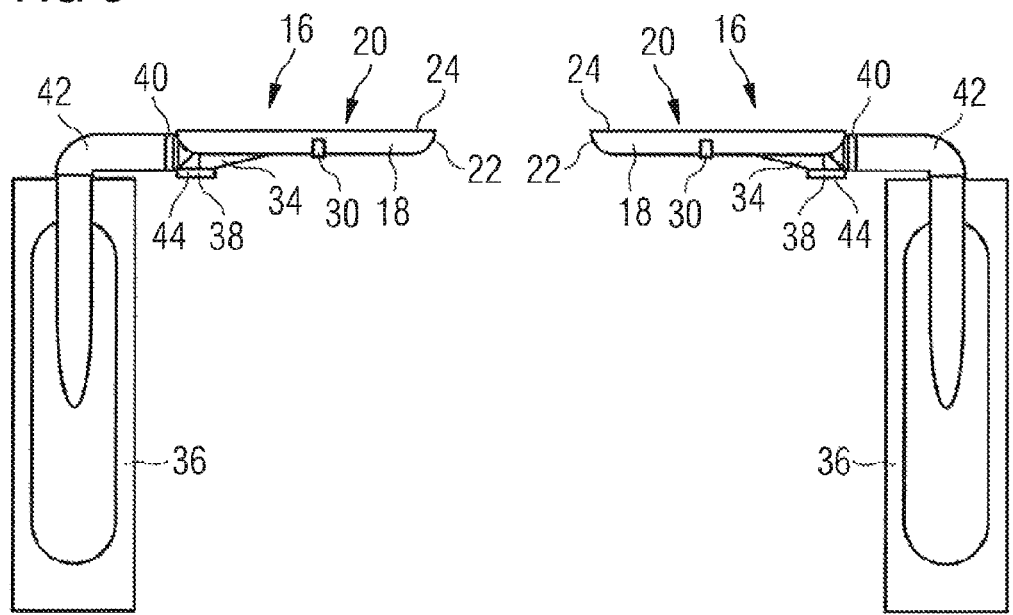

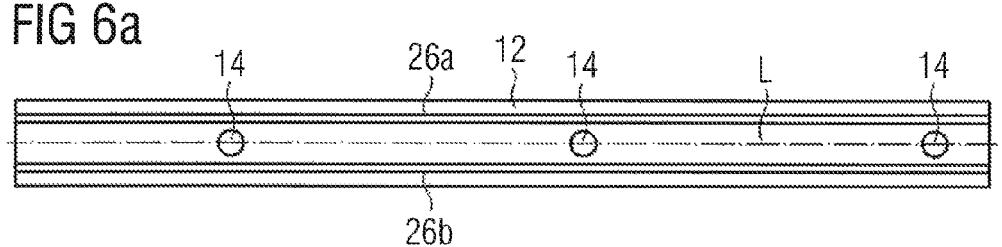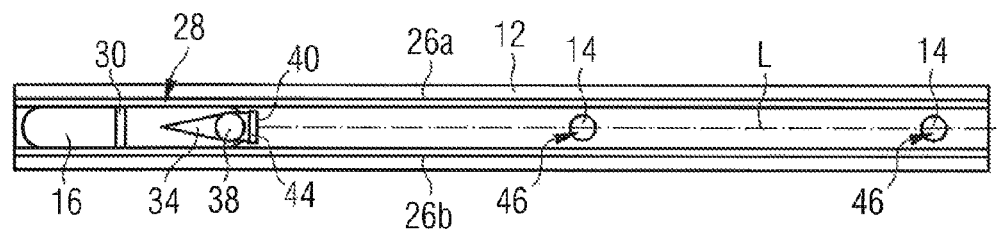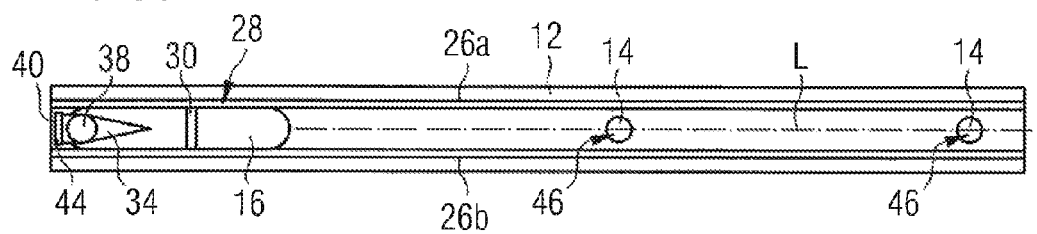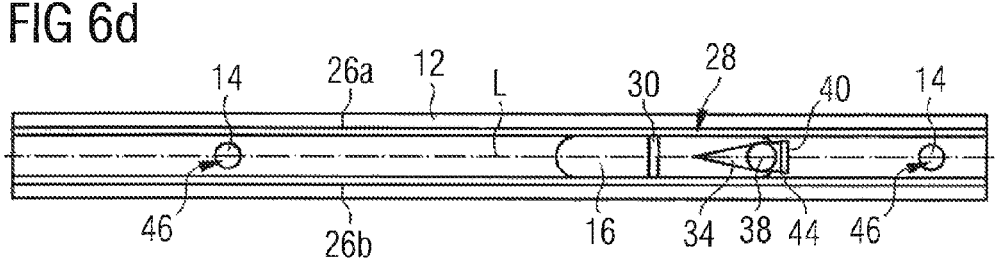

VENTILATION SYSTEM AND AIRCRAFT AIR-CONDITIONING SYSTEM

CROSS REFERENCE TO RELATED APPLICATIONS

The present application claims priority to German Patent Application No. 10 2010 052 157.4-22, filed Nov. 22, 2010 and claims the benefit of U.S. Provisional Patent Application No. 61/415,996, filed Nov. 22, 2010, each of which is incorporated herein by reference.

The invention relates to a ventilation system intended for installation in an aircraft passenger cabin, in particular an individual ventilation system, and to an aircraft air-conditioning system provided with such a ventilation system.

Modern passenger aircraft are usually equipped with an individual ventilation system, which individually supplies the passengers in the passenger cabin of the aircraft with air-conditioning air provided by an aircraft air-conditioning system. A standard individual ventilation system comprises an individual air supply pipe, which extends, in the aircraft passenger cabin, in a region beneath luggage compartments that serve to receive items of passenger hand luggage or in a region of a side wall of the passenger cabin, substantially parallel to a longitudinal axis of the aircraft passenger cabin. Flowing through the individual air supply pipe is air-conditioning air, which is supplied to the individual air supply pipe from an air-conditioning air generating means of the aircraft air-conditioning system.

An arrangement comprising an air line and a passenger supply unit is known from EP 0 607 602 A1. The air line consists of a rectilinear, dimensionally stiff hollow profile having a longitudinal slot, the longitudinal slot being sealed by a sealing lip. A slot, which is routed in the longitudinal direction of the air line, and which has an extraction connection stub projecting into an interior of the hollow profile, is provided for extracting the air. The slot has an outer guide and an inner guide, which are firmly connected to the extraction connection stub and are arranged at a distance from one another such that they form an intermediate space that is matched to the sealing lip.

DE 10 2010 018 502 relates to a supply system for supplying passengers on board an aircraft, the supply system comprising a supply line and a plurality of supply modules that can be connected to a supply opening of the supply line for the purpose of supplying the passengers. The supply modules are displaceable relative to one another along the supply line. Each supply module has an associated baffle, which can be displaced along the supply line in order to cover a supply opening not used to connect a supply module to the supply line.

The invention is directed towards the object of providing a ventilation system for an aircraft passenger cabin that can be easily installed and, if necessary, easily reconfigured. Further, the invention is directed towards the object of specifying an aircraft air-conditioning system equipped with such a ventilation system.

This object is achieved by the ventilation system having the features of Claim 1 and by an aircraft air-conditioning system having the features of Claim 15.

A ventilation system according to the invention, intended for installation in an aircraft passenger cabin, comprises an air supply pipe, which has a plurality of air outlet openings disposed in a distributed manner along its longitudinal axis. The air supply pipe is preferably realized in the form of a rigid pipe and can be composed, for example, of an extruded plastic material. The cross-section of the air supply pipe can be adapted, according to the requirement, to the installation space conditions in the aircraft passenger cabin and can be, for example, rectangular, round or oval. Preferably, the air outlet openings of the air supply pipe are disposed in a distributed, successive manner, substantially in a line along the longitudinal axis of the air supply pipe. If necessary, however, an offset disposition of the air outlet openings is also conceivable. The air supply pipe is preferably connected to an air-conditioning air generating means of an aircraft air-conditioning system, such that, when the ventilation system according to the invention is in operation, the air supply pipe carries a flow of air-conditioning air that is supplied to the air supply pipe from the air-conditioning air generating means of the aircraft air-conditioning system.

The ventilation system according to the invention further comprises an air chamber housing that is connectable to the air supply pipe at various positions along the longitudinal axis of the air supply pipe. The connection of the air chamber housing to the air supply pipe is effected in such a way that air-conditioning air flowing through the air supply pipe can be supplied, through an air outlet opening provided in the air supply pipe, into the air chamber housing. The air chamber housing is preferably fastened to the air supply pipe in such a way that the air chamber housing covers at least one air outlet opening of the air supply pipe. In principle, the air chamber housing can be of any shape. Preferably, however, the air chamber housing is of an elongated shape, such that the air chamber housing can be displaced over a relatively long distance along the longitudinal axis of the air supply pipe, but can still cover the air outlet opening realized in the air supply pipe. In order that the weight of the ventilation system according to the invention is not increased unnecessarily, however, the longitudinal extent of the air chamber housing is preferably less than the distance between two mutually adjacent air outlet openings in the air supply pipe.

Finally, the ventilation system according to the invention comprises a connection device, which is adapted to connect the air chamber housing to an air supply device for supplying air-conditioning air into the aircraft passenger cabin. The air supply device for supplying air-conditioning air into the aircraft passenger cabin can be, for example, an individually operable air nozzle of an individual ventilation system. As an alternative to this, however, the air supply device can also be an air supply device of a centrally controlled sub-system of the cabin ventilation system.

The ventilation system according to the invention enables air supply devices, disposed at various positions in the aircraft passenger cabin, for supplying air-conditioning air in aircraft passenger cabins, to be connected in a simple and flexible manner, to the air supply pipe, through appropriate positioning of the air chamber housing along the longitudinal axis of the air supply pipe. In the case of the ventilation system according to the invention, therefore, it is possible to dispense with the provision of flexible hoses of differing lengths, as are used, for example, in conventional individual ventilation systems. Likewise, it is no longer necessary to provide corresponding receivers for the hoses. Finally, the flexible positioning of the air chamber housing along the longitudinal axis of the air supply pipe makes it possible to dispense with the provision of double air outlets on the air supply pipe and of double air inlets on the supply device for supplying air-conditioning air into the aircraft passenger cabin. The ventilation system according to the invention is thus distinguished by a low weight and ease of installation. Further, the ventilation system can be reconfigured with little effort as part of a reconfiguration of the aircraft passenger cabin. The advantage of the ease of reconfiguration of the ventilation system applies particularly when the ventilation system according to the invention is realized as an individual ventilation system. In principle, however, the ventilation system according to the invention can also be realized in the form of a centrally controlled sub-system of the passenger cabin ventilation system of the aircraft.

The air chamber housing preferably comprises an open coupling region, which is delimited by a side wall region of the air chamber housing and adapted to enable air-conditioning air emerging from an air outlet opening in the air supply pipe to be supplied into the air chamber housing. For example, the air chamber housing, in its coupling region, can have an open semicircular or semi-oval cross-section. It is understood, however, that the air chamber housing can also have an angular cross-section. When the air chamber housing is connected to the air supply pipe, the air chamber housing, in the region of its open coupling region, adjoins an outer surface of the air supply pipe, such that air-conditioning air emerging from an air outlet opening in the air supply pipe can flow into the air chamber housing through the open coupling region of the air chamber housing.

Preferably, the air chamber housing comprises a sealing element, which extends along an edge of the side wall region of the air chamber housing, said edge facing towards the air supply pipe. In particular, the sealing element is a continuous sealing element that enables the air chamber housing to be sealed off in respect of the environment along the entire edge of the side wall region of the air chamber housing that faces towards the air supply pipe. The sealing element, when connected to the air supply pipe, preferably acts together with an outer surface of the air supply pipe.

In a preferred embodiment of the ventilation system according to the invention, the air supply pipe comprises a guide device, which extends along its longitudinal axis and which is adapted to enable the air chamber housing to be displaced along the longitudinal axis of the air supply pipe in a guided manner. A guide device provided on the air supply pipe enables the ventilation system according to the invention to be installed and/or reconfigured in a particularly simple manner. The guide device can comprise, for example, two guide rails that extend along the longitudinal axis of the air supply pipe, substantially parallelwise in relation to one another. The guide rails can project from an outer surface of the air supply pipe towards the air chamber housing and act together with outer surfaces of two mutually opposite side wall region portions of the air chamber housing, to enable the air chamber housing to be displaced along the longitudinal axis of the air supply pipe in a guided manner.

Preferably, the ventilation system according to the invention further comprises a locking device, for locking the air chamber housing in a desired position along the longitudinal axis of the air supply pipe. The locking device enables the air chamber housing to be securely fixed in a desired position along the longitudinal axis of the air supply pipe.

Preferably, the locking device comprises a locking element, which, between an unlocking position and a locking position, is movably connected to the air chamber housing and, in its locking position, can be brought into engagement with a receiving device provided on the air supply pipe. For the purpose of positioning the air chamber housing relative to the air supply pipe, the locking element can then be brought into its unlocking position, thereby enabling the air chamber housing to move along the longitudinal axis of the air supply pipe in an unimpeded manner, but also enabling the air chamber housing to be completely detached from the air supply pipe. When the air chamber housing is disposed in the desired position along the longitudinal axis of the air supply pipe, the locking element can be moved into its locking position in order to fix the air chamber housing to the air supply pipe.

The receiving device provided on the air supply pipe preferably comprises at least one receiving groove. The receiving groove can be formed on the guide device that extends along the longitudinal axis of the air supply pipe. In the case of a particularly preferred embodiment of the ventilation system according to the invention, two guide rails of the guide device, which extend along the longitudinal axis of the air supply pipe, substantially parallelwise in relation to one another, are each provided with a receiving groove. The locking element can then be realized in the form of a locking element that is rotatably connected to the air chamber housing. When the locking element is in the unlocking position, the locking element is not in engagement with the receiving grooves of the receiving device. When the locking element is in its locking position, however, edge portions of the locking element engage in the receiving grooves of the receiving device.

Preferably, the locking element of the locking device is adapted, when in its locking position, to apply to the air chamber housing a force that presses the air chamber housing against the air supply pipe. The locking element then not only performs the function of fixing the air chamber housing in a desired position on the air supply pipe, but also presses the sealing element of the air chamber housing against the outer surface of the air supply pipe, and is thereby instrumental in connecting the air chamber housing to the air supply pipe in a sealing manner.

The locking element is preferably realized in the form of a locking clip, which encompasses the air chamber housing, at least in portions, in its locking position. A locking element realized in this way is of a simple design, but nevertheless not only allows the air chamber housing to be securely fixed to the air supply pipe, but also makes it possible to apply to the air chamber housing a force that presses the air chamber housing against the air supply pipe.

In the ventilation system according to the invention, air outlet openings in the air supply pipe that are not connected to the air chamber housing, or not covered by an air chamber housing, are preferably closed in a sealing manner by means of corresponding closure devices. Air-conditioning air flowing through the air supply pipe is thereby prevented from emerging from the air supply pipe in an unwanted manner. The closure devices can be realized, for example, in the form of screw-plugs, plugs or the like.

The connection device of the ventilation system according to the invention preferably has a plurality of connection openings for connecting the air chamber housing to an air supply device for supplying air-conditioning air into the aircraft passenger cabin. Because the connection device is designed to have a plurality of connection openings, the flexibility of the ventilation system is further increased.

For example, a first connection opening of the connection device can be disposed such that air-conditioning air can flow through it substantially perpendicularly in relation to the longitudinal axis of the air supply pipe. A second connection opening of the connection device can be disposed, on the other hand, such that air-conditioning air can flow through it substantially parallelwise in relation to the longitudinal axis of the air supply pipe.

A connection opening of the connection device not connected to an air supply device for feeding air-conditioning air into the aircraft passenger cabin is preferably closed in a sealing manner by means of a corresponding closure device.

Air-conditioning air is thereby prevented from emerging from the air chamber housing in an unwanted manner. A screw plug or a plug can be used as a closure device.

It is possible, in principle, for all connection openings of the connection device to be connected to a supply device, or a plurality of supply devices, for feeding air-conditioning air into the aircraft passenger cabin. Preferably, however, only one connection opening of the connection device is connected to an air supply device for feeding air-conditioning air into the aircraft passenger cabin. Depending on the position of the air supply device relative to the air chamber housing, the connection opening of the connection device that is disposed in the more favourable manner can be used to connect the air chamber housing to the air supply device. For example, a first connection opening of the connection device, through which air-conditioning air can flow substantially perpendicularly in relation to the longitudinal axis of the air supply pipe, can be directly connected to the air supply device, whereas a second connection opening of the connection device, through which air-conditioning air can flow substantially parallelwise in relation to the longitudinal axis of the air supply pipe, can be sealed off by means of a corresponding closure device. Such a configuration of the ventilation system according to the invention is particularly appropriate if the air supply device is positioned, and the air chamber housing can be disposed, relative to the air supply pipe, in such a way that it is possible for the connection device to be directly connected to the air supply device.

If necessary, however, the connection device can also comprise an extension adapter, which connects a connection opening of the connection device to an air supply device for feeding air-conditioning air into the aircraft passenger cabin. Preferably, such an extension adapter is connected to the second connection opening of the connection device, through which air-conditioning air can flow substantially parallelwise in relation to the longitudinal axis of the supply pipe.

An aircraft air-conditioning system according to the invention comprises a ventilation system described above.

Figure 2B:
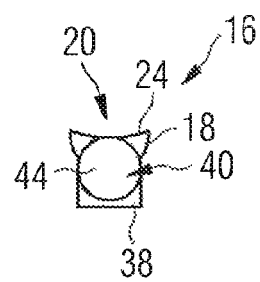
Figure 2C:
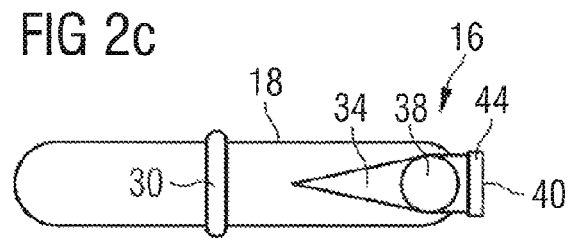
Figure 3A:
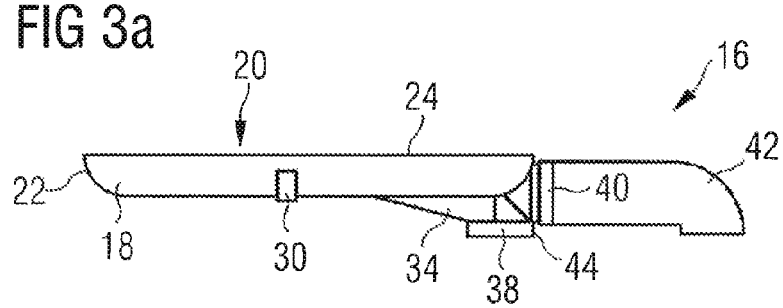
Figure 3B:
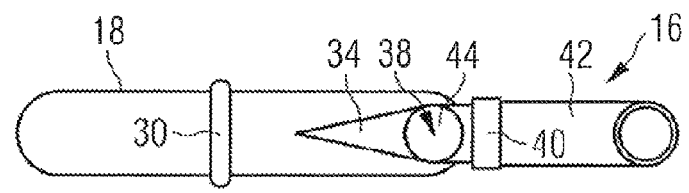
Figure 6E:
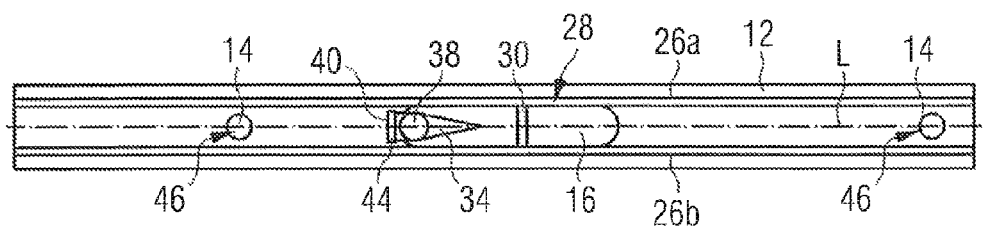
Figure 6F:
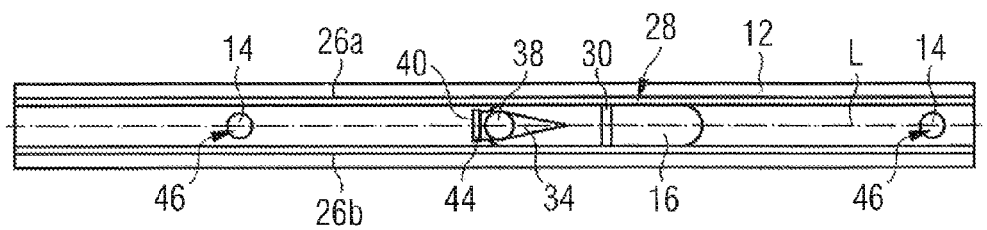
Figure 6G:
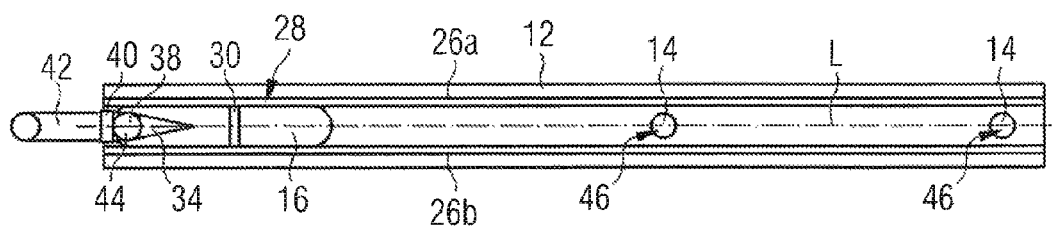

A preferred embodiment of the invention is now described more fully with reference to the appended schematic drawings, of which FIG. 1 shows a cross-sectional representation of an aircraft passenger cabin ventilation system in the form of an individual ventilation system, FIGS. 2a to 2c show various views of an air chamber housing of the ventilation system, FIGS. 3a to 3b show various views of an air chamber housing of the ventilation system equipped with an extension adapter, FIG. 4 shows two air chamber housings, according to FIGS. 2a to 2c, which are each connected to a supply device for feeding air-conditioning air into an aircraft passenger cabin, FIG. 5 shows two air chamber housings, according to FIGS. 3a to 3c, which are each connected to an air supply device for feeding air-conditioning air into an aircraft passenger cabin, and FIGS. 6a to 6g show side views of an air supply pipe (FIG. 6a), and of an air supply pipe to which an air chamber housing has been connected (FIGS. 6b and 6g).

A ventilation system 10, illustrated in the figures, for feeding air-conditioning air into an aircraft passenger cabin is realized as an individual ventilation system, which serves to individually supply the passengers in the passenger cabin of an aircraft with air-conditioning air provided by an aircraft air-conditioning system. The ventilation system 10 comprises an air supply pipe 12, which is connected to an air-conditioning air generating means, not shown, of the aircraft air-conditioning system. When the ventilation system 10 is in operation, air-conditioning air flows through the air supply pipe 12, which air-conditioning air is supplied to the air supply pipe 12 from the air-conditioning air generating means of the aircraft air-conditioning system. As can be seen in FIG. 1, in the exemplary embodiment illustrated in the figures, the air supply pipe 12 has an oval cross-section. FIGS. 6a to 6g show that the air supply pipe 12 is provided with a plurality of air outlet openings 14, which are disposed in a distributed manner along the longitudinal axis L of the air supply pipe. In the exemplary embodiment of a ventilation system 10 that is shown, the air outlet openings 14 are positioned, at constant distances from one another, substantially in a line. If required, however, the air supply pipe 12 can also be provided with air outlet openings 14 that are offset in relation to one another and/or positioned at differing distances from one another.

The ventilation system 10 further comprises an air chamber housing 16. As can best be seen in FIGS. 6b to 6g, the air chamber housing 16 can be connected to the air supply pipe at various positions along the longitudinal axis L of the air supply pipe 12. The air chamber housing 16, when connected to the air supply pipe 12, covers an air outlet opening 14 realized in the air supply pipe 12, such that air-conditioning air flowing through the air supply pipe 12 can be fed into the air chamber housing 16 through the air outlet opening 14 provided in the air supply pipe 12 and covered by the air chamber housing 16.

As can best be seen in FIGS. 2a to 2c and 3a to 3b, the air chamber housing 16 comprises a side wall region 18, which delimits an open coupling region 20 of the air chamber housing 16. When the air chamber housing 16 is connected to the air supply pipe 12, air-conditioning air emerging from the air outlet opening 14 of the air supply pipe 12 covered by the air chamber housing 16 can be fed into the air chamber housing 16 through the open coupling region 20. The air chamber housing 16 is provided with a continuous sealing element 24 along an edge 22 of its side wall region 18. When the air chamber housing 16 is connected to the air supply pipe 12, the sealing element 24 bears on an outer surface of the air supply pipe 12 and thereby seals off the air chamber housing 16 in respect of the environment. The air chamber housing 16 is of an elongated shape. However, the longitudinal extent of the air chamber housing 16 is less than the distance between two mutually adjacent air outlet openings 14 of the air supply pipe 12.

The air supply pipe 12 is provided with a guide device 26, which is designed to enable the air chamber housing 16 to be displaced along the longitudinal axis L of the air supply pipe 12 in a guided manner. The guide device 26 comprises two guide rails 26a, 26b, extending along the longitudinal axis L of the air supply pipe 12, substantially parallelwise in relation to one another, which act together with two mutually opposite outer surface portions of the side wall region 18 of the air chamber housing 16. The guide device 26 enables the air chamber housing 16 to be displaced along the longitudinal axis L of the air supply pipe 12 in a guided manner.

A locking device 28 is provided for fixing the air chamber housing 16 in a desired position on the air supply pipe 12. The locking device 28 comprises a locking element 30 realized in the form of a locking clip, which is rotatably connected to the air chamber housing 16, between an unlocking position and a locking position. In its locking position shown in the figures, the locking element 30 is in engagement with a receiving device 32 provided on the air supply pipe 12. The receiving device 32 comprises two mutually opposite receiving grooves 32a, 32b, which are realized on the guide rails 26a, 26b (see FIG. 1). When the locking element 30 is in its locking position, edge portions of the locking element 30 engage in the receiving grooves 32a, 32b, whereby the air chamber housing 16 is fixed in its position relative to the air supply pipe 12. Further, when in its locking position, the locking element 30, realized in the form of a locking clip that spans portions of the air chamber housing 16, applies to the air chamber housing 16 a force that presses the air chamber housing 16 against the air supply pipe 12. The sealing action of the sealing element 24 is thereby improved.

Finally, the ventilation system 10 comprises a connection device 34, which serves to connect the air chamber housing 16 to an air supply device 36, shown in FIGS. 4 and 5, for feeding air-conditioning air into the aircraft passenger cabin. In the exemplary embodiment of a ventilation system 10 shown here, the air supply device 36 is realized in the form of an individually operable air nozzle. As can best be seen in FIGS. 2a to 2c, the connection device 34 comprises a first connection opening 38, which is positioned such that air-conditioning air can flow through it substantially perpendicularly in relation to the longitudinal axis L of the air supply pipe 12. A second connection opening 40 of the connection device 34, on the other hand, is disposed such that air-conditioning air can flow through it substantially parallelwise in relation to the longitudinal axis L of the air supply pipe 12. The first connection opening 38 serves, as shown in FIG. 4, to directly connect the air chamber housing to an air supply device 36 for feeding air-conditioning air into the aircraft passenger cabin. The second connection opening 40, on the other hand, as shown in FIG. 5, can be used to switch an extension adapter 42 between the air chamber housing 16 and the air supply device 36. The connection device 38, 40 that is not connected to the air supply device 36 is in each case closed in a sealing manner by a closure device 44, which can be realized, for example, in the form of a screw-plug.

FIGS. 6b to 6f illustrate various possibilities for positioning the air chamber housing 16 relative to the air supply pipe 12. For example, the air chamber housing 16, as illustrated in FIGS. 6b and 6c, can be rotated by 180° relative to the air supply pipe 12, in order to adapt the position of the first connection opening 38 of the connection device 34 to the position of an air supply device 36 provided for connection to the air chamber housing 16. Further, it is possible for the air chamber housing 16 to be displaced parallelwise in relation to the longitudinal axis L of the air supply pipe 12, whereby the air chamber housing 16, as shown in FIGS. 6d and 6e, can be made to connect to an adjacent air outlet opening 14 in the air supply pipe. As an alternative to this, however, the air chamber housing 16 can also be displaced parallelwise in relation to the longitudinal axis L of the air supply pipe only to such an extent that it still covers the same air outlet opening 14 in the air supply pipe but nevertheless allows a certain adaptation to the position of an air supply device 16 to be connected to the air chamber housing 16 (see FIGS. 6e and 6f). Finally, as illustrated in FIG. 6g, the air chamber housing 16 can additionally be provided with an extension adapter 42, which connects the second connection opening 40 of the connection device 34 to the air supply device 36.

In order to prevent air-conditioning air from emerging from the air supply pipe 12 in an unwanted manner, in the case of the ventilation system 10, air outlet openings 14 in the air supply pipe 12 that are not covered by the air chamber housing 16 are covered in a sealing manner by corresponding closure devices 46, for example realized in the form of screw plugs.

The invention claimed is:

1. Ventilation system for installation in an aircraft passenger cabin, which ventilation system comprising:
   an air supply pipe, which has a plurality of air outlet openings disposed in a distributed manner along its longitudinal axis,
   an elongated air chamber housing that is connectable to the air supply pipe at various positions along the longitudinal axis of the air supply pipe, the elongated air chamber housing comprising a side wall region which defines an elongation of the air chamber housing in a longitudinal direction of the air supply pipe, such that air-conditioning air flowing through the air supply pipe is supplyable, through an air outlet opening provided in the air supply pipe, into the air chamber housing,
   the air chamber housing further comprising an open coupling region delimited by the elongation defined by the side wall region of the air chamber housing, which couples the air chamber housing to an area of the air supply pipe between two mutually adjacent air outlet openings of the air supply pipe,
   a connection device, which is adapted to connect the air chamber housing to an air supply device for supplying air-conditioning air into the aircraft passenger cabin, and
   wherein a longitudinal extent of the air chamber housing is less than the distance between the two mutually adjacent air outlet openings of the air supply pipe.

2. Ventilation system according to claim 1, wherein the open coupling region is adapted to enable air-conditioning air emerging from an air outlet opening in the air supply pipe to be supplied into the air chamber housing.

3. Ventilation system according to claim 1, wherein the air chamber housing comprises a sealing element, which extends along an edge of the side wall region of the air chamber housing, said edge facing towards the air supply pipe.

4. Ventilation system according to claim 1, wherein the air supply pipe comprises a guide device, which extends along its longitudinal axis and which is adapted to enable the air chamber housing to be displaced along the longitudinal axis of the air supply pipe in a guided manner.

5. Ventilation system according to claim 1, including a locking device, for locking the air chamber housing in a desired position along the longitudinal axis of the air supply pipe.

6. Ventilation system according to claim 5, wherein the locking device comprises a locking element, which, between an unlocking position and a locking position, is movably connected to the air chamber housing and, in its locking position, can be brought into engagement with a receiving device provided on the air supply pipe.

7. Ventilation system according to claim 6, wherein the receiving device provided on the air supply pipe comprises at least one receiving groove, which is formed on the guide device that extends along the longitudinal axis of the air supply pipe.

8. Ventilation system according to claim 6, wherein the locking element is adapted, when in its locking position, to apply to the air chamber housing a force that presses the air chamber housing against the air supply pipe.

9. Ventilation system according to claim 6, wherein the locking element, when in its locking position, encompasses the air chamber housing, at least in portions.

10. Ventilation system according to claim 1, wherein the air outlet openings in the air supply pipe that are not covered by an air chamber housing are closed in a sealing manner by means of corresponding closure devices.

11. Ventilation system according to claim 1, wherein the connection device has a plurality of connection openings for connecting the air chamber housing to an air supply device for supplying air-conditioning air into the aircraft passenger cabin.

12. Ventilation system according to claim 11, wherein a first connection opening of the connection device is disposed such that air-conditioning air can flow through it substantially perpendicularly in relation to the longitudinal axis of the air supply pipe, and a second connection opening of the connection device is disposed such that air-conditioning air can flow through it substantially parallel wise in relation to the longitudinal axis of the air supply pipe.

13. Ventilation system according to claim 12, wherein a connection opening of the connection device not connected to an air supply device for feeding air-conditioning air into the aircraft passenger cabin is closed in a sealing manner by means of a corresponding closure device.

14. Ventilation system according to claim 12, wherein the connection device comprises an extension adapter, which is connected, in particular, to the second connection opening of the connection device.

\* \* \* \* \*